(12) United States Patent
Watanabe (10) Patent No.: US 7,529,479 B2
(45) Date of Patent: May 5, 2009

(54) CAMERA VIEWER DEVICE

(75) Inventor: Tatsuya Watanabe, Urayasu (JP)

(73) Assignee: Ricoh Company, Ltd., Tokyo (JP)

( * ) Notice: Subject to any disclaimer, the term of this patent is extended or adjusted under 35 U.S.C. 154(b) by 325 days.

(21) Appl. No.: 11/492,944

(22) Filed: Jul. 26, 2006

(65) Prior Publication Data

US 2007/0025724 A1    Feb. 1, 2007

(30) Foreign Application Priority Data

Jul. 28, 2005    (JP)    ............... 2005-218394

(51) Int. Cl.
*G03B 17/18*    (2006.01)
(52) U.S. Cl. .................. 396/287; 396/544; 348/333.09; 348/341
(58) Field of Classification Search ................. 396/287, 396/439, 537, 544; 348/333.09, 341
See application file for complete search history.

(56) References Cited

U.S. PATENT DOCUMENTS 3,868,711 A * 2/1975 Sekida et al. ............... 396/373
2007/0019098 A1 * 1/2007 Senba et al. ........... 348/333.08

FOREIGN PATENT DOCUMENTS

| JP | 11-96194 | 4/1999 |
| JP | 3083214 | 10/2001 |
| JP | 3087089 | 4/2002 |
| JP | 3093775 | 2/2003 |
| JP | 2004-297561 | 10/2004 |

* cited by examiner

*Primary Examiner*—William B. Perkey
*Assistant Examiner*—Warren K Fenwick
(74) *Attorney, Agent, or Firm*—Oblon, Spivak, McClelland, Maier & Neustadt, P.C.

(57) ABSTRACT

A camera viewer device including an assembling sheet member developed and changed in shape between a box-shaped angle finder and a direct viewing finder. The sheet member includes first and second mirror wall portions with first and second inner mirrors, an attachment wall portion attached to a back face of a camera body, and an upper wall portion. In the box-shaped angle finder, the first mirror reflects an image of a subject in a display panel on the back face of the camera body and downwardly projects the image of the subject, the second mirror upwardly projects the projected image, a window portion of the attachment wall portion is opposed to the display panel, and a window portion of the upper wall portion is opposed to the second mirror wall portion to look into the interior of the assembled sheet member through the window portion of the upper wall portion.

20 Claims, 10 Drawing Sheets

CAMERA VIEWER DEVICE

CONVENTION PRIORITY CLAIMED

The convention priority of Japanese patent application No. 2005-218394 filed on Jul. 28, 2005 is claimed in this application. The entire contents of the Japanese patent application No. 2005-218394 are incorporated herein by reference.

BACKGROUND OF THE INVENTION (1) Field of the Invention

The present invention relates to an improvement on a camera viewer device, more particularly, on a viewer device for a liquid display type digital camera.

(2) Related Art Statement

According to conventional camera viewer devices, for example, viewer devices for liquid display type digital cameras are known, which enable an image of a subject displayed in a display panel provided at a back face of a camera body to be observed from vertical and lateral directions through a mirror disposed at a rotatable support member (See JP-A 2004-297561).

However, since a single mirror is used in such a conventional viewer device for the liquid display type digital camera, the image of the subject is observed as an inverted image through the viewer device used as a low angle finder when the viewer device is looked into from the upper side at the back face side of the camera body. Consequently, it is unfavorably difficult to decide an image composition by feeling.

In such a conventional viewer device, external light is often reflected by the mirror, when photographing is performed in a bright place. Thus, the external light is likely to enter eyes upon reflection with the mirror, so that the contrast of the image of the subject displayed in the display panel becomes relatively lower to unfavorably decrease visual recognition of the image of the subject displayed in the display panel. There is similar inconvenience in case that the image of the subject displayed in the display panel is directly observed without the mirror.

Under the circumstances, a digital camera is proposed in which a hood is detachably provided as a direct-viewing type finder at a side of a back face of a camera body. According to this, visual recognition of an image of a subject displayed on a display panel is improved, because the external light is shielded.

SUMMARY OF THE INVENTION

The present invention has been made in view of the above circumstances, and is aimed at providing a camera viewer device, which can be used both as a low angle finder and as a direct-viewing type finder.

A first aspect of the present invention relates to a camera viewer device, comprising an assembling sheet member adapted to be developed and changed in shape between a first configuration to be detachably attachable to a side of a back face of a camera body and used as a box-shaped angle finder and a second configuration to be detachably attachable to a side of a back face of a camera body and used as a direct viewing finder, said sheet member comprising a first mirror wall portion attached with a first mirror at an inner side thereof, a second mirror wall portion attached with a second mirror at an inner side thereof, an attachment wall portion to be attached to the back face side of the camera body and having a window portion to be opposed with the back face side of the camera body, and an upper wall portion, wherein when the sheet member is assembled in the form of the first configuration, the first mirror reflects an image of a subject displayed in a display panel disposed on the back face side of the camera body and downwardly projects the image of the subject, the second mirror upwardly projects the projected image projected from the first mirror, the window portion of the attachment wall portion is opposed to the display panel, and the window portion of the upper wall portion is opposed to the second mirror wall portion so that the interior of the assembled sheet member is looked into through the window portion of the upper wall portion.

The following (1) to (8) are preferred embodiments of the first aspect of the present invention. Any combinations of these features are also preferred embodiments of the present invention unless no discrepancy occurs.

(1) The camera viewer device further comprises an attachment member, wherein when the sheet member is assembled in the form of the second configuration, the attachment member fixes the first mirror wall portion at a position which is retracted in a direction of the bottom from the position opposed to the display panel, and the attachment member specifies the positional relationship among the second mirror wall portion, the first mirror wall portion and the upper wall portion so that the attachment member may fix the upper wall portion at the position opposed to the display panel.

(2) The camera viewer device further comprises a pair of external light-shielding wall portions integrally and bendably formed with said attachment wall portion, wherein each of the external light-shielding wall portions is connected to the second mirror wall portion, the first mirror wall portion and the upper wall portion and the external light-shielding wall portions shield the external light that would enter a space, from sides of the assembled sheet member, defined by the upper wall portion and the second mirror wall portion opposed to each other.

(3) The attachment member comprises a pair of light-shielding wall portions a light-shielding upper wall portion and a pair of light-shielding side wall portions, wherein when the sheet member is assembled in the form of the second configuration, the light-shielding upper wall portion covers the second mirror portion and the first mirror portion from an upper side, and a pair of the light-shielding wall portions shield the external light that would enter the space defined between the light-shielding upper wall portion and a pair of the light-shielding side wall portion opposed to each other.

(4) Inserting pieces are formed at each of a pair of the external light-shielding wall portions of the sheet member, and each of the first mirror wall portion, the upper wall portion and the second mirror wall portion is formed with insertion holes into which the inserting pieces are to be inserted, respectively.

(5) Insertion holes are formed at each of a pair of the external light-shielding wall portion of the sheet member, and each of the first mirror wall portion, the upper wall portion and the second mirror wall portion is formed with inserting pieces which are inserted into the insertion holes, respectively.

(6) The attachment member is formed with inserting pieces to be inserted into insertion holes formed in the sheet member as well as insertion holes into which the inserting pieces formed at the sheet member are inserted.

(7) A transparent member is provided in the window portion of the upper wall portion.

(8) The transparent member is an ocular lens.

A second aspect of the present invention relates to a camera viewer device, comprising an assembling sheet member adapted to be developed and changed in shape between a first configuration to be detachably attachable to a side of a back face of a camera body and used as a box-shaped angle finder and a second configuration to be detachably attachable to a side of a back face of a camera body and used as a direct viewing finder, said sheet member comprising:

a first mirror wall portion attached with a first mirror at an inner side thereof, a second mirror wall portion attached with a second mirror at an inner side thereof, an attachment wall portion to be attached to the back face side of the camera body and having a window portion to be opposed to the back face side of the camera body, an upper wall portion having a window portion and a pair of external light-shielding wall portions integrally and bendably formed at the attachment wall portion, and a pair of external light shielding wall portions, wherein when the sheet member is assembled in the form of the first configuration, the first mirror reflects an image of a subject displayed in a liquid crystal display panel disposed on the back face side of the camera body and downwardly projects the image of the subject, the second mirror upwardly projects the projected image projected from the first mirror, the window portion of the attachment wall portion is opposed to the display panel, the window portion of the upper wall portion is opposed to the second mirror wall portion so that the interior of the assembled sheet member is looked into through the window portion of the upper wall portion, and each of the external light-shielding wall portions is connected to the second mirror wall portion, the first mirror wall portion and the upper wall portion and the external light-shielding wall portions shield the external light that would enter a space defined by the upper wall portion and the second mirror wall portion opposed to each other, from sides of the assembled sheet member, wherein when the sheet member is assembled in the form of the second configuration, the attachment member fixes the first mirror wall portion at a position which is retracted in a direction of the bottom from the position opposed to the display panel, and the attachment member specifies the positional relationship among the second mirror wall portion, the first mirror wall portion and the upper wall portion so that the attachment member may fix the upper wall portion at the position opposed to the display panel, and wherein a pair of the external light-shielding wall members are formed with inserting pieces, the attachment member is formed with inserting pieces, the attachment member is formed with inserting pieces, the attachment wall portion, the upper wall portion, the first mirror wall portion, the second mirror wall portion and the attachment member are formed with insertion holes, respectively the corresponding inserting pieces of a pair of the external light-shielding wall portion are inserted into the insertion holes formed in the upper wall portion, the first mirror wall portion and the second mirror wall portion, respectively, the inserting pieces of the attachment member are inserted into the insertion holes formed in the upper wall portion and the insertion hole formed in the first mirror wall portion, and the corresponding inserting pieces formed in a pair of the external light-shielding wall members are inserted into the insertion holes of the attachment member, respectively.

The following is a preferred embodiment of the second aspect of the present invention.

At least one of the attachment wall portion and the camera body is provided with a hook and loop fastener or an adhesive tape for attaching the sheet member to the camera body.

According to the first aspect of the present invention and the preferred embodiment (1), the camera viewer device can be used as a low angle finder and as a direct-viewing type finder.

According to the above preferred embodiments (2) and (3), external light is prevented from entering the finder, so that visual recognition of the image of the subject is improved.

According to the above preferred embodiments (4) and (6), the finder can be assembled without increasing the number of parts.

According to the preferred embodiment (8), the image of the subject can be more clearly recognized.

According to the second aspect of the present invention, the camera viewer device can be used as a low angle finder and as a direct-viewing type finder, external light is prevented from entering the finder, the image of the subject can be observed in a magnified state, and the finder can be assembled without increasing the number of parts.

According to the preferred embodiment of the second aspect to the present invention, the camera viewer device can be easily attached and detached relative to the camera body.

The entire contents of Japanese patent application No 2005-218394 filed on Jul. 28, 2005 of which the convention priority is claimed in this application is incorporated herein by reference.

BRIEF DESCRIPTION OF THE DRAWINGS

For a better understanding of the invention, reference is made to the attached drawings, wherein.

PREFERRED EMBODIMENTS OF THE PRESENT INVENTION

In the following, preferred embodiments of the camera viewer device according to the present invention for a digital camera will be explained with reference to the attached drawings.

Figure 1:
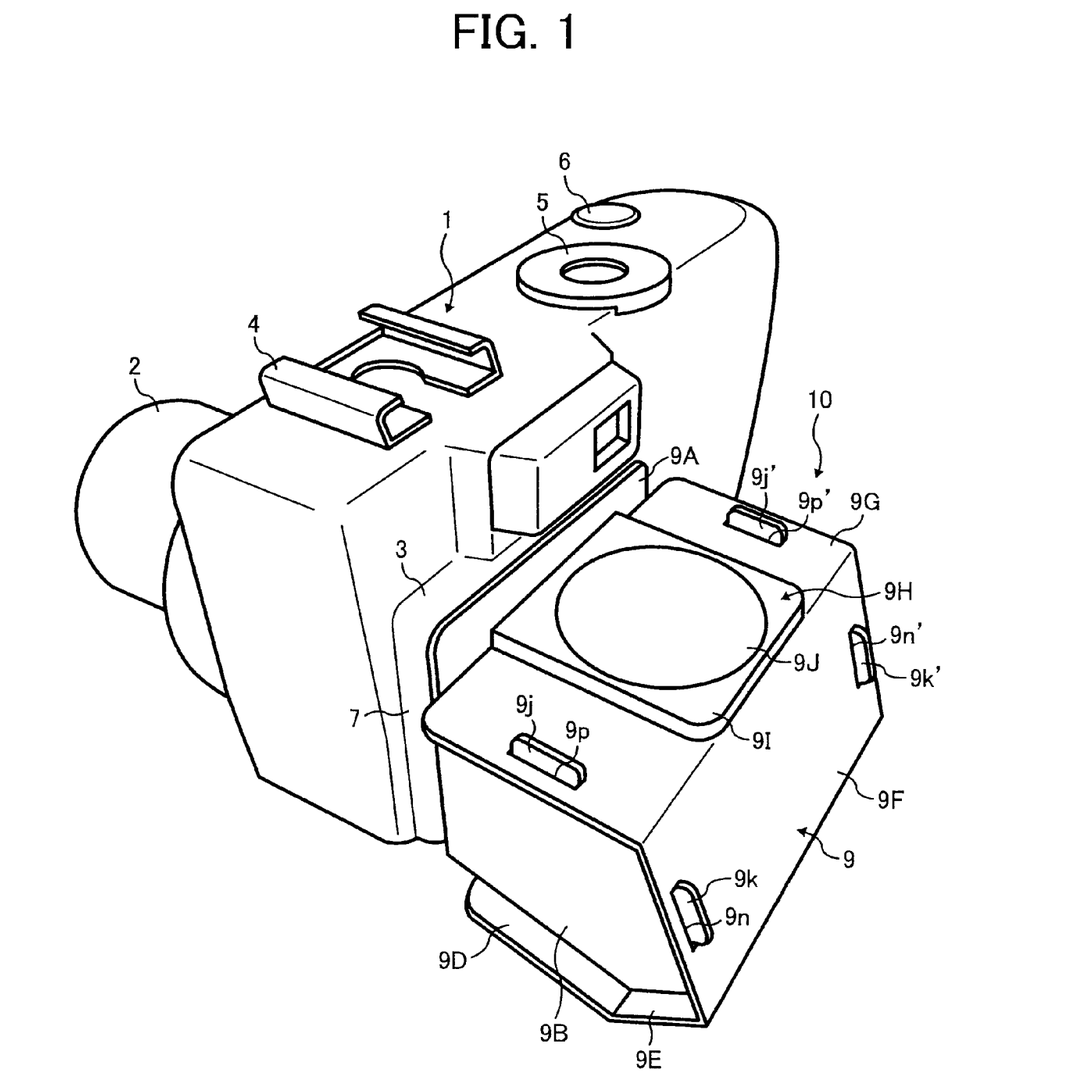
FIG. 1 is an external view of a first embodiment of a camera viewer device according to the present invention attached to a digital camera.
Figure 2:
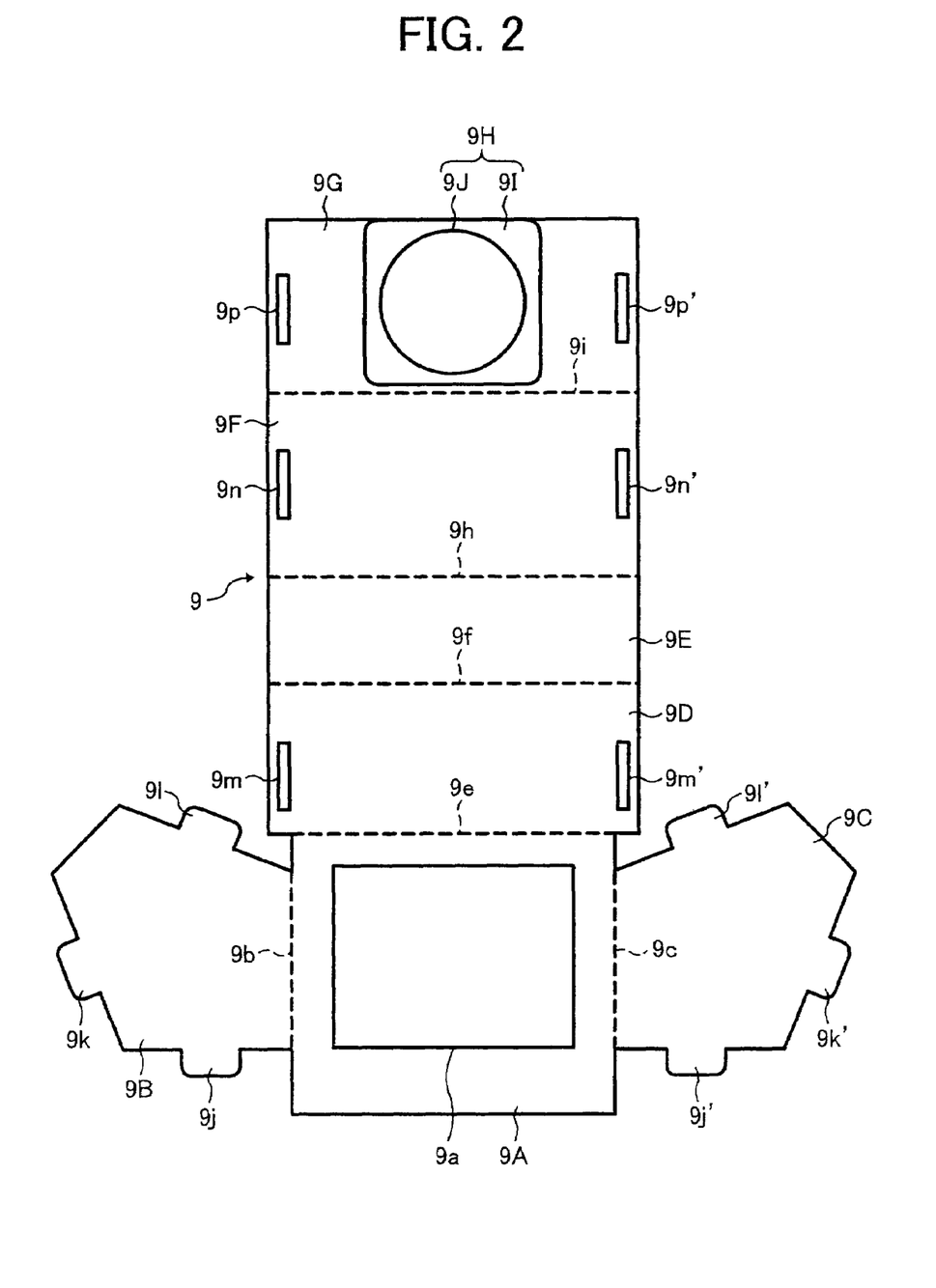
FIG. 2 is a developed plane view of the camera viewer device according to the present invention which is assembled in the form of a first configuration as viewed from a plane facing outside when assembled in the form of the first configuration.
Figure 3:
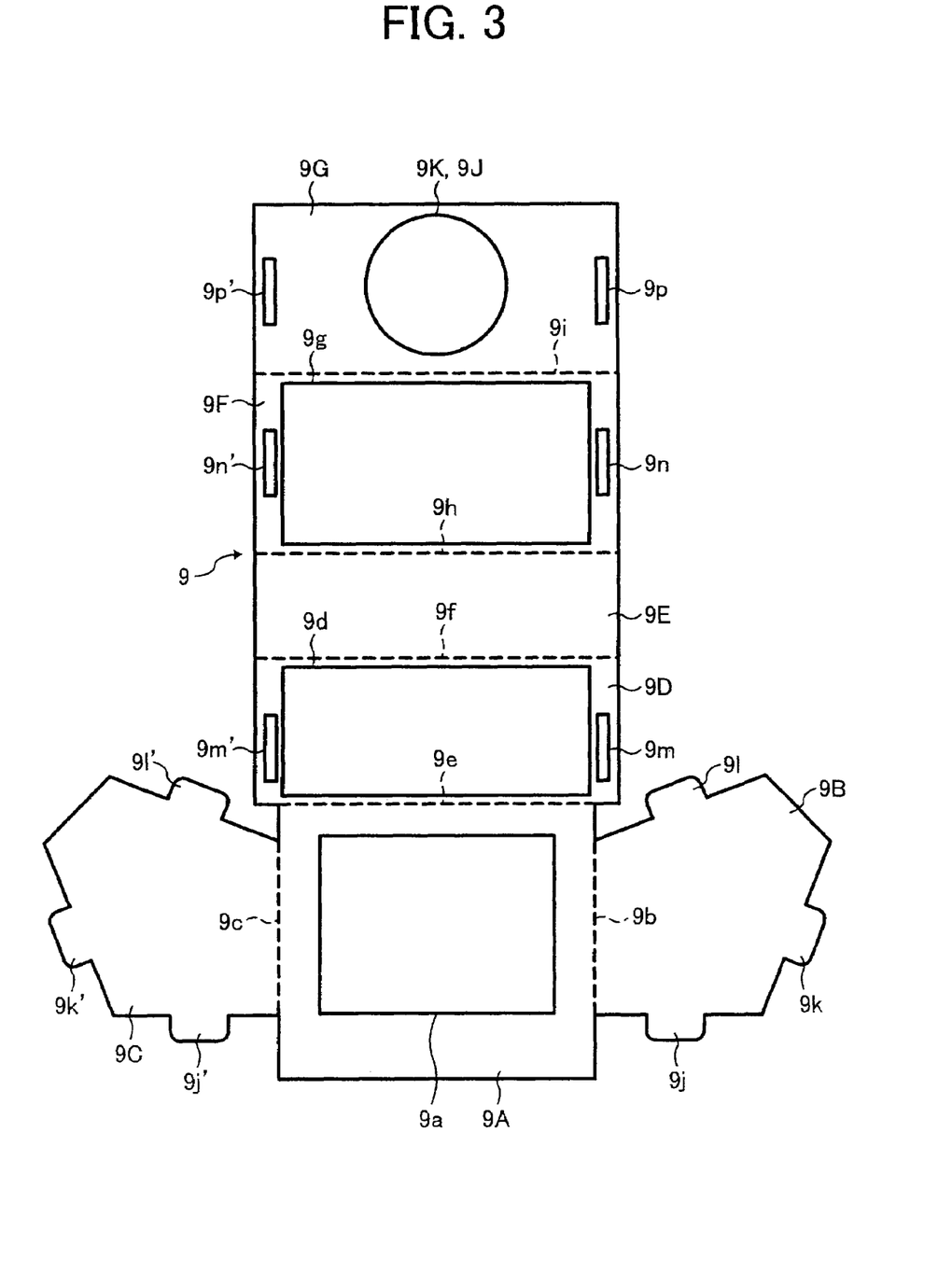
FIG. 3 is a developed plane view of the camera viewer device according to the present invention which is assembled in the form of the first configuration as viewed from a plane facing inside when assembled in the form of the first configuration.
Figure 4:
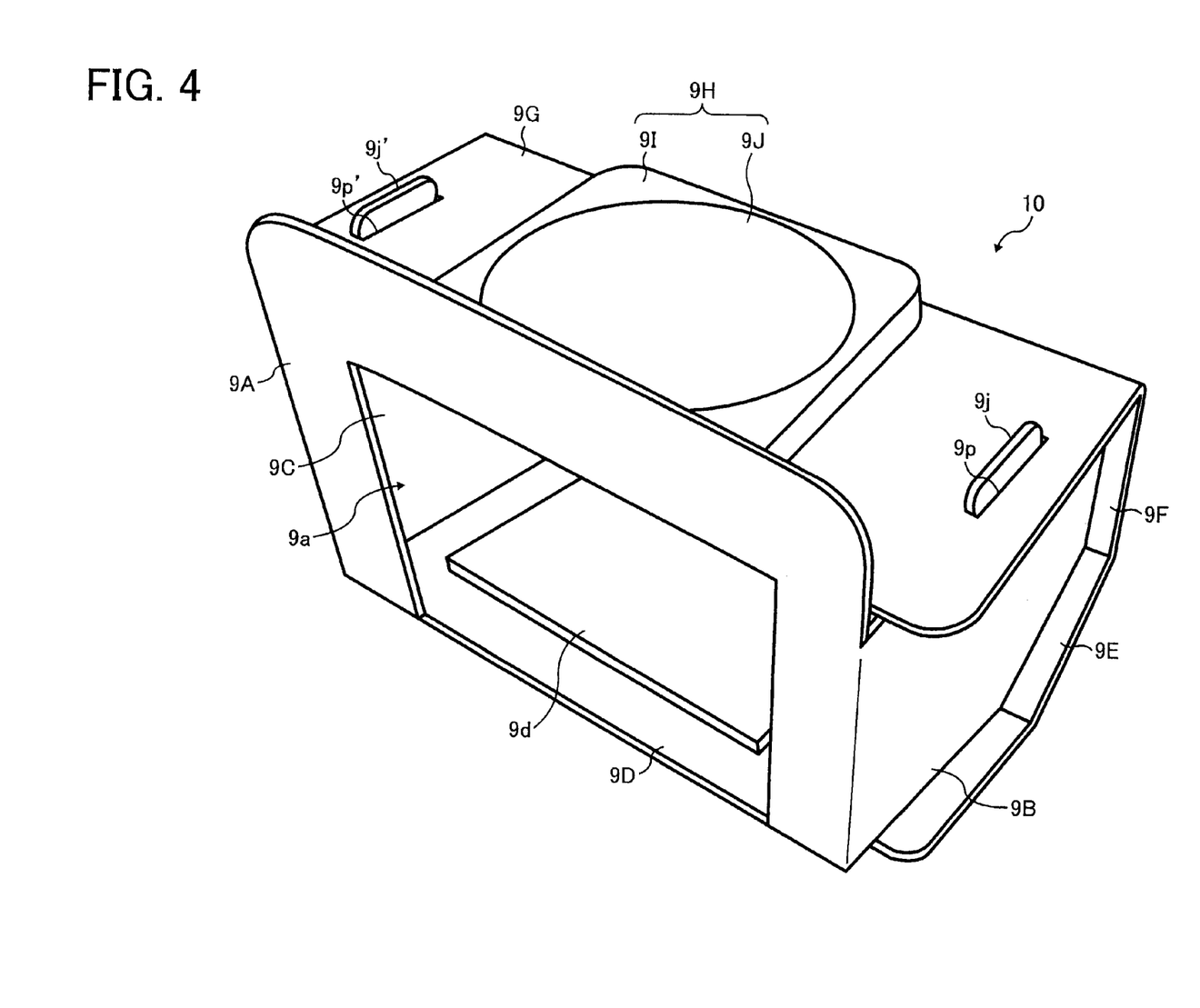
FIG. 4 is an external view of the camera viewer device according to the present invention which is assembled in the form of the first configuration.

FIG. 1 is an external view of a first embodiment of a camera viewer device according to the present invention attached to a digital camera. FIG. 2 and FIG. 3 are developed plane views of the camera viewer device according to the present invention. FIG. 4 is an external view of the camera viewer device according to the present invention which is assembled in the form of the first configuration.

In FIG. 1, a reference numeral 1 denotes a camera body, and a lens barrel 2 is provided at a front face portion of the camera body 1. A liquid crystal type display panel 3 having an almost rectangular shape is provided at a back face portion of the camera body 1. A connector 4 for an external strobe device, a mode dial 5 and a shutter button 6 are provided at an upper portion of the camera body 1. At the front face portion, the back face portion and the upper portion are provided various parts and members not shown for performing various functions, respectively. Illustration of these parts and members are omitted.

The camera viewer device 10 is attached to a rectangular peripheral wall 7 surrounding the display panel 3 of the camera body 1. The camera viewer device 10 is assembled by bending the assembling sheet member 9 shown in FIGS. 2 and 3.

The sheet member 9 is designed to be developed and changed in shape between a first configuration (See FIGS. 1 and 4) which is detachably attached to the back face of the camera body 1 and used as a box-shaped angle finder and a second configuration (See FIGS. 5 and 6) which is detachably attached to the back face of the camera body and used as a box-shaped direct-viewing finder.

The sheet member 9 has an attachment wall portion 9A to be attached to the display panel 3. A rectangular window portion 9a is formed in the attachment wall portion 9A, and is to be opposed to the display panel 3. A pair of bendable external light-shielding wall portions 9B, 9C are formed continuously with the attachment wall portion 9A. A pair of the external light-shielding wall portion 9B and 9C are bent and raised at right angles to the attachment wall portion 9A along imaginary bending lines 9b and 9c, respectively, which extend in extending directions of short sides of the rectangular window portion 9a shown in FIG. 3. Other detailed construction and function of the external light-shielding wall portions 9B, 9C will be described later.

A second mirror wall portion 9D is formed with the attachment wall portion 9A, continuing in the extending directions of the imaginary bending lines 9b and 9c. The second mirror wall portion 9D is located at a bottom portion when the sheet member is assembled in the form of the first configuration. To an inner face of the second mirror wall portion 9D is attached a rectangular mirror 9d shown in FIG. 3. The attachment wall portion 9A is bent forwardly from the paper and raised at right angles to the second mirror wall portion 9D along an imaginary bending line 9e, which extends at right angles to the extending directions of the imaginary bending lines 9b, 9c shown in FIG. 3. Other detailed construction and function of the second mirror wall portion 9D will be described later.

A connecting wall portion 9E is formed with the second mirror wall portion 9D, continuing in the extending direction of the second mirror wall portion 9D. The connecting wall portion 9E forms an inclined portion when the sheet member is assembled in the form of the first configuration. The connecting wall portion 9E is bent forwardly from the paper, raised and inclined at a given angle to the second mirror wall portion 9D along an imaginary bending line 9f which extends in parallel to the imaginary bending line 9e shown in FIG. 3.

The connecting wall portion 9E is provided with a first mirror wall portion 9F extending continuously in the extending direction of the connecting wall portion 9E. The first mirror wall portion 9F is opposed to the display panel 3 when the sheet member is assembled in the form of the first configuration. The first mirror wall portion 9F is attached at its inside with a first rectangular mirror 9g shown in FIG. 3. This first mirror wall portion 9F is bent forwardly from the paper, raised and inclined at a given angle to the connecting wall portion 9E along an imaginary bending line 9h, which extends in parallel to the imaginary bending line 9f shown in FIG. 3.

The first mirror wall portion 9F is formed with an upper wall portion 9G, continuing in the extending direction of the connecting wall portion 9E. The upper wall portion 9G is located upwardly from and opposed to the second mirror wall portion 9D when the sheet member is bent in the form of the first configuration. A transparent member is provided at a side of an outer face of the upper wall portion 9G as shown in FIG. 2. In the above embodiment, this transparent member is constituted by an ocular lens 9H. The ocular lens 9H is constituted by a planar attachment portion 9I and a magnifying lens 9J. As shown in FIG. 3, a round window portion 9K is formed in the upper wall portion 9G through which the interior is looked inside. The magnifying lens 9j is located opposite to a round opening 9L.

The upper wall portion 9G is bent forwardly from the paper, raised and inclined at a given angle to the first mirror wall portion 9F along an imaginary bending line 9i, which extends in parallel to the imaginary bending line 9h shown in FIG. 3.

When the sheet member 9 is assembled in the form of a box according to the first configuration, a pair of the external light-shielding wall portions 9B and 9C form an outer shape similar to a pentaprism ordinarily used in the so-called optical camera when the box-shaped camera viewer device is viewed from a side direction. Angles formed between sides of each of the external light-shielding wall portions 9B and 9C are set at those of faces between the pentaprism.

Inserting pieces 9j to 9l and 9j' to 9l' are formed at respective sides of a pair of the external light-shielding wall portions 9B and 9C. As shown in FIG. 3, the second mirror wall portion 9D is provided at its both short sides with a pair of insertion holes 9m and 9m' to sandwich the mirror 9d. As shown also in FIG. 3, the first mirror wall portion 9F is provided at its both short sides with a pair of insertion holes 9n and 9n' to sandwich the mirror 9g. The upper wall portion 9G is formed with a pair of insertion holes 9p and 9p' in the extending directions of the insertion holes 9m, 9n and 9m', 9n', respectively, as shown in FIG. 3, which insertion holes sandwich the round window portion 9K and are spaced from and opposed to it.

The insertion holes 9m, 9m' correspond to the inserting pieces 9l and 9l', respectively, whereas the insertion holes 9n and 9n' correspond to the inserting pieces 9k and 9k', respectively. The insertion holes 9p and 9p' correspond to the inserting pieces 9j and 9j', respectively.

The external light-shielding wall portions 9B and 9C are bent from the attachment wall portion 9A along the imaginary bending lines 9b and 9c, respectively. The attachment wall portion 9A is bent along the imaginary bending line 9e. The second mirror wall portion 9D is bent along the imaginary bending line 9d. The connecting wall portion 9E is bent from the second mirror wall portion 9D along the imaginary bending line 9f. The first mirror wall portion 9F is bent from the connecting wall portion 9E along the imaginary bending line 9h. The upper wall portion 9G is bent from the first mirror wall portion 9F along the imaginary bending line 9g. The inserting pieces 9j, 9k and 9l (9j', 9k' and 9l') are inserted into the insertion holes 9m, 9n and 9p (9m', 9n' and 9p'), respectively. As shown in FIG. 4, the camera viewer device 10 is assembled in the form of the first configuration which is detachably attached to the back face of the camera body and used as the box-shaped angle finder.

At the attachment wall portion 9A of the camera viewer device is provided a hook and loop fastener, a magnet or an adhesive tape (not shown) to attach the sheet member 9 to the back face portion of the camera body. Such a hook and loop fastener, a magnet or an adhesive tape (not shown) is provided at the back face portion of the camera body to attach the sheet member 9 to the back face portion of the camera body.

Figure 5:
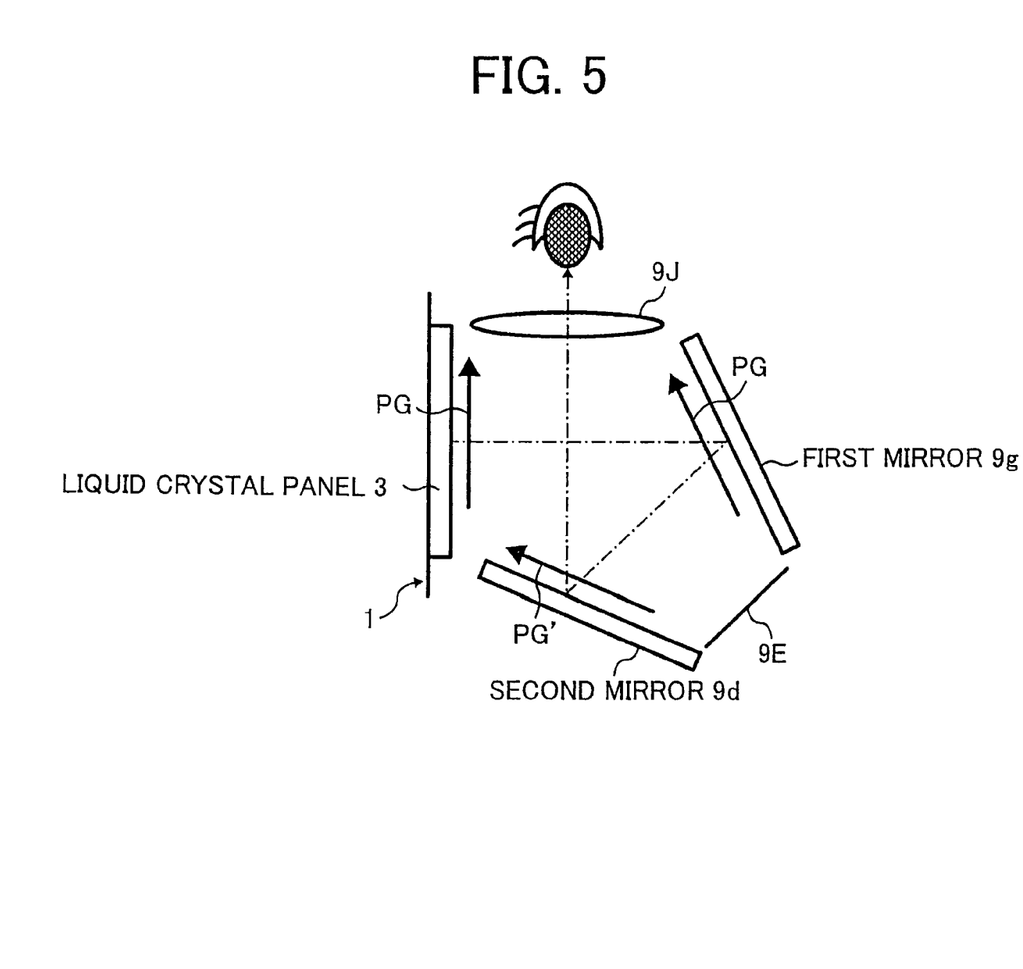
FIG. 5 is a schematic view illustrating the function of the camera viewer device according to the present invention as assembled in the form of the first configuration.

According to the camera viewer device 10, when the camera viewer device assembled in the box-shaped form as the first configuration and used as the low angle finder is looked inside from the upper side at the rear side of the camera body 1, as shown in FIG. 5, an image PG of a subject displayed in the display panel 3 is reflected by the first mirror 9g. The image PG of the subject displayed in the display panel 3 is downwardly projected to the second mirror 9d by the first mirror 9d.

The projected image PG' of the image PG of the subject projected onto the second mirror 9d by the first mirror 9g is upwardly reflected by this second mirror 9g.

When the camera viewer device 10 is looked inside from the upper side at the rear side of the camera body 1 through the magnifying lens 9J as shown in FIG. 5, the image PG of the subject is visually recognized as an erected image through the reflections at two times by the first and second mirrors 9g and 9d. This exhibits an effect that the picture composition can be more easily determined by feeling.

Since this camera viewer device 10 is provided with a pair of the external light-shielding wall portions 9B and 9C, the external light can be prevented from entering the box even in photographing at a bright place. Thus, it gives an effect that the visual recognition of the image PG of the subject displayed in the display panel 3 is improved.

Next, explanation will be made, with reference to FIGS. 6 to 9, on the sheet member 9 assembled in the form of the second configuration to be used as the direct viewing finder having a box-like shape shown in FIG. 6.

Figure 7:
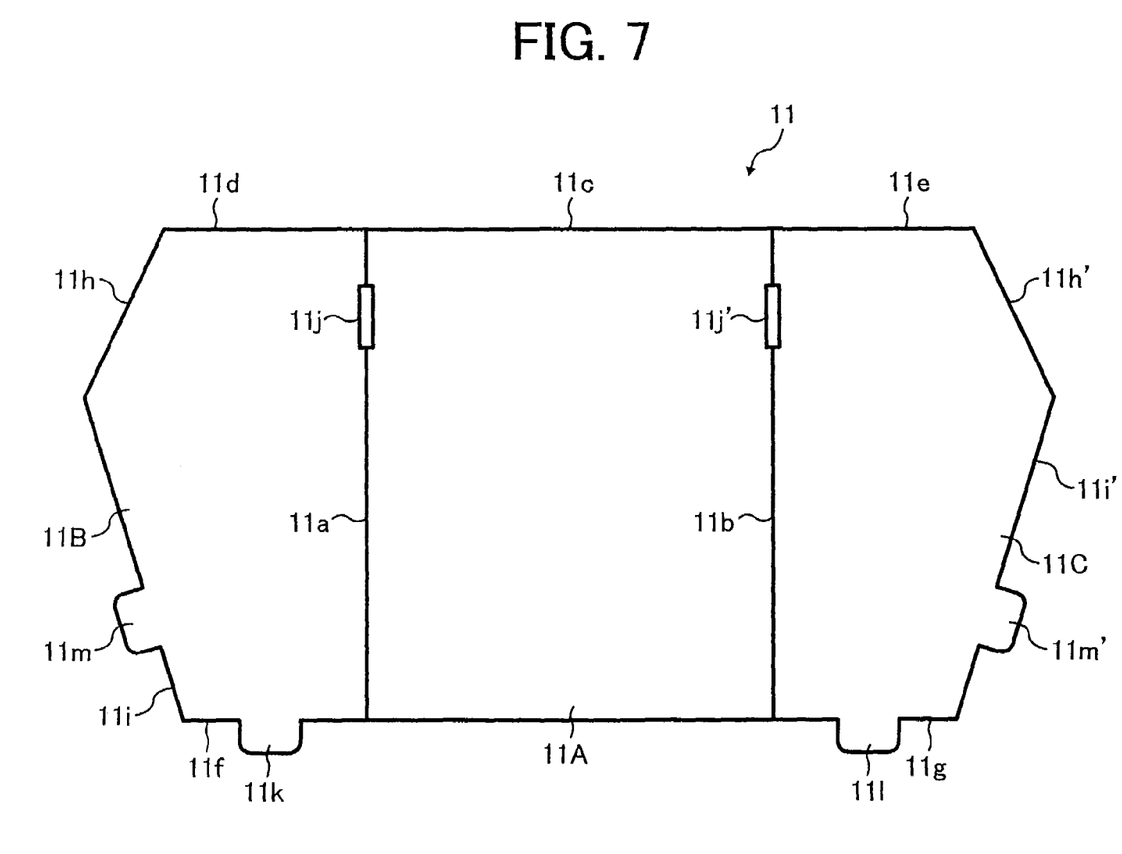
FIG. 7 is a developed plane view of an attachment member to be used for assembling the camera viewer according to the present invention in the form of the second configuration.
Figure 8:
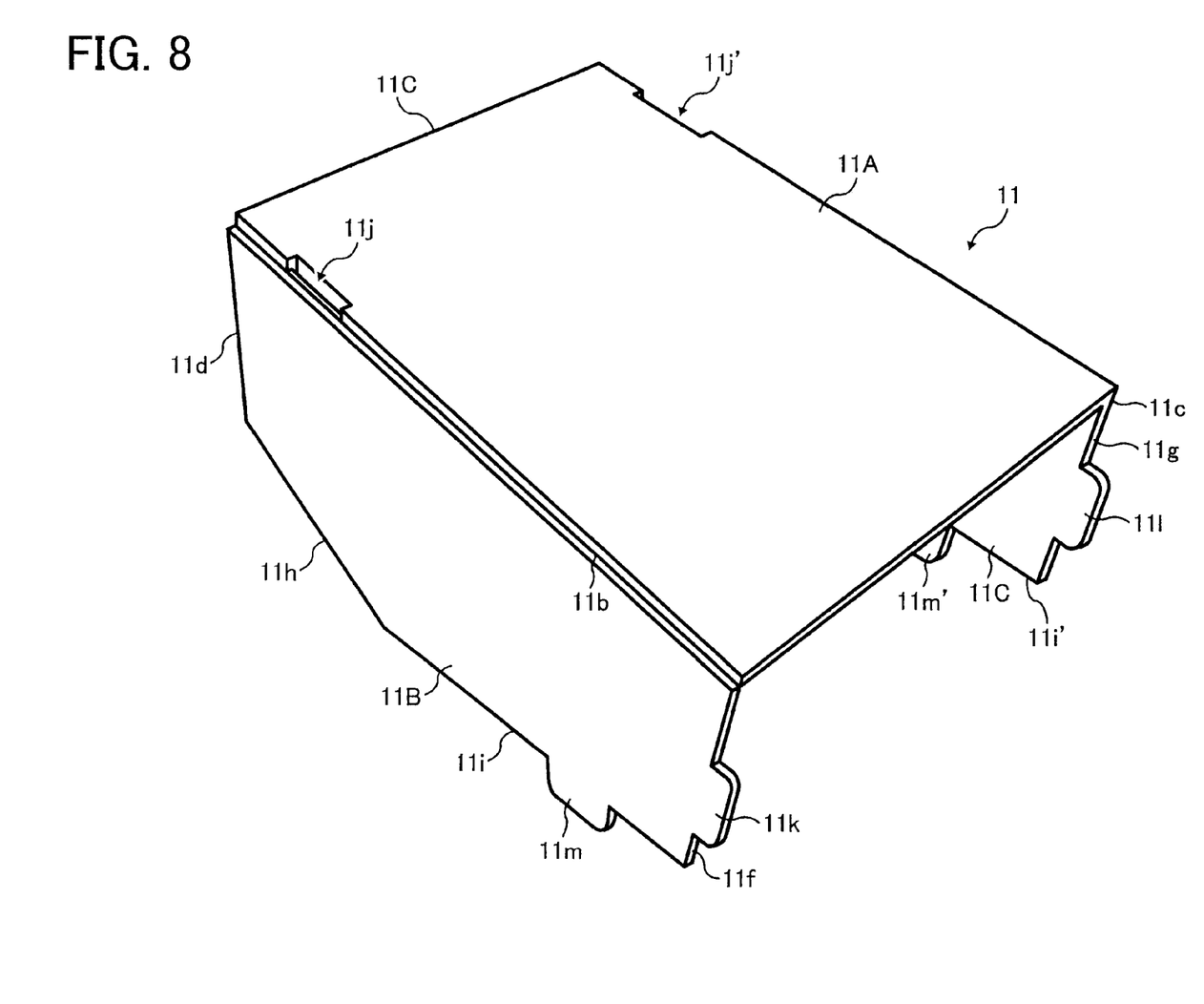
FIG. 8 is an external view of the attachment member having a pair of sidewall portions downwardly bent from an upper wall portion shown in FIG. 7.

FIG. 7 shows a developed view of an attachment member 11 to be used when the camera viewer device is used as the box-like direct viewing finder. The attachment member 11 is constituted by a light-shielding upper wall portion 11A and a pair of light-shielding side wall portions 11B and 11C. Hinge portions 11a and 11b are formed between the light-shielding upper wall portion 11A and a pair of the light-shielding side wall portions 11B and 11C, respectively. As shown in FIG. 8, a pair of the light-shielding side wall portions 11B and 11C are downwardly bendable from the light-shielding upper wall portion 11A.

The light-shielding upper wall portion 11A and a pair of the light-shielding side wall portions 11B and 11C are formed with abutting sides 11c, 11d and 11e, respectively, at a side at which the attachment member abuts on the attachment wall portion 9A when the sheet member 9 is combined with the attachment member 11. A pair of the light-shielding side wall portions 11B and 11C are formed with abutting sides 11f and 11g, respectively, at a side at which the attachment member abuts on the upper wall portion 9G when the sheet member 9 is combined with the attachment member 11. The light-shielding side wall portions 11B and 11C are formed with abutting sides 11h, 11i (11h', 11i'), respectively, at a side at which the attachment member abuts on the second mirror wall portion 9D, the connecting wall portion 9E and the first mirror wall portion 9F when the sheet member 9 is combined with the attachment member 11.

Between the light-shielding upper wall portion 11A and the light-shielding side wall portion 11B is formed a insertion hole 11j into which the inserting piece 9j of the external light-shielding wall portion 9B is inserted (See FIG. 4). Between the light-shielding upper wall portion 11A and the light-shielding side wall portion 11C is formed an insertion hole 11j' into which the inserting piece 9j' of the external light-shielding wall portion 9C is inserted (See FIG. 4).

At the abutting sides 11f and 11g are formed inserting pieces 11k and 11l, respectively, which are to be inserted into the insertion holes 9p, 9p' of the upper wall portion 9G. At the abutting sides 11i and 11i' are formed inserting pieces 11m and 11m', respectively, which are to be inserted into the insertion holes 9n and 9n' of the first mirror wall portion 9F, respectively.

In order to attach the attachment member 11 to the sheet member 9, as shown in FIG. 8, a pair of the light-shielding side wall portions 11B and 11C are downwardly bent from the light-shielding upper wall portion 11A of the attachment member 11 shown in FIG. 7.

Then, while the attachment wall portion 9A is raised and a pair of the external light-shielding wall portions 9B and 9C are raised, the respective abutting sides 11c, 11d and 11e of the light-shielding upper wall portion 11A and a pair of the light-shielding side wall portions 11B and 11C are abutted on the attachment wall portion 9A. While the respective abutting sides 11h and 11h' of a pair of the light-shielding wall portions 11B and 11C are abutted on the second mirror wall portion 9D, the inserting pieces 9j and 9j' of a pair of the external light-shielding wall portion 9B and 9C are inserted into the insertion holes 11j and 11j', respectively.

While the abutting side 11i and 11i' of the attachment member 11 are abutted onto the connecting wall member 9E and the first mirror wall portion 11F, the inserting pieces 11m and 11m' are inserted into the insertion holes 9n and 9n' of the first mirror wall portion F, respectively. By so doing, the first mirror wall portion 9F of the sheet member 9, which is opposed to the display panel 3 in the first configuration, is retracted toward the bottom portion and abutted to and fixed by the abutting sides 11i and 11i', respectively.

Figure 9:
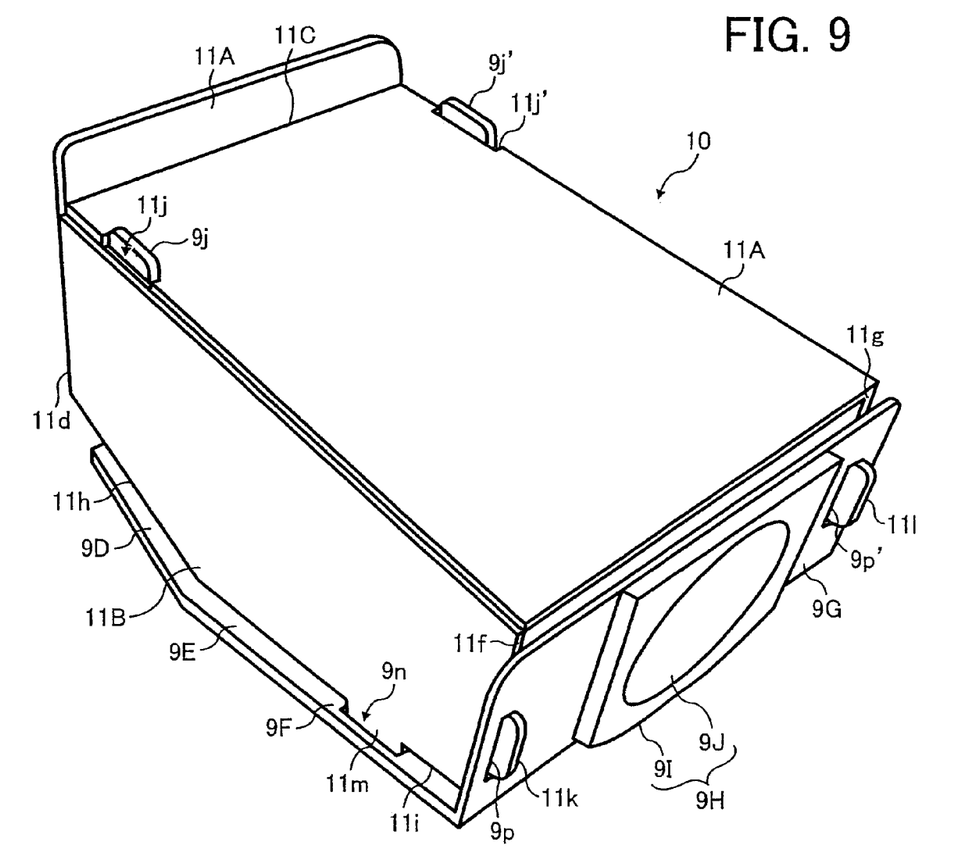
FIG. 9 is an external view of the camera viewer device assembled in the second configuration in which a sheet member is fixed by using the attachment member in FIG. 8.

Then, the upper wall portion 9G of the sheet member 9 is abutted on the abutting sides 11f and 11g of a pair of the light-shielding side wall portions 11B and 11C, and the inserting pieces 11k and 11l are inserted into the insertion holes 9p and 9p' of the upper wall portion 9G, respectively. By so doing, the camera viewer device 10 is assembled to be used as the box-shaped direct viewing finder as the second configuration as shown in FIG. 9.

When the sheet member 9 is assembled in the form of the second configuration, the attachment member 11 fixes the first mirror wall portion 9F at a position which is retracted in a direction of the bottom from the position opposed to the display panel 3. In order to fix the upper wall portion 9G at a position opposed to the display panel 3, the attachment member 11 functions to specify the positional relationship among the second mirror wall portion 9D, the first mirror wall portion 9F and the upper wall portion 9G.

Figure 6:
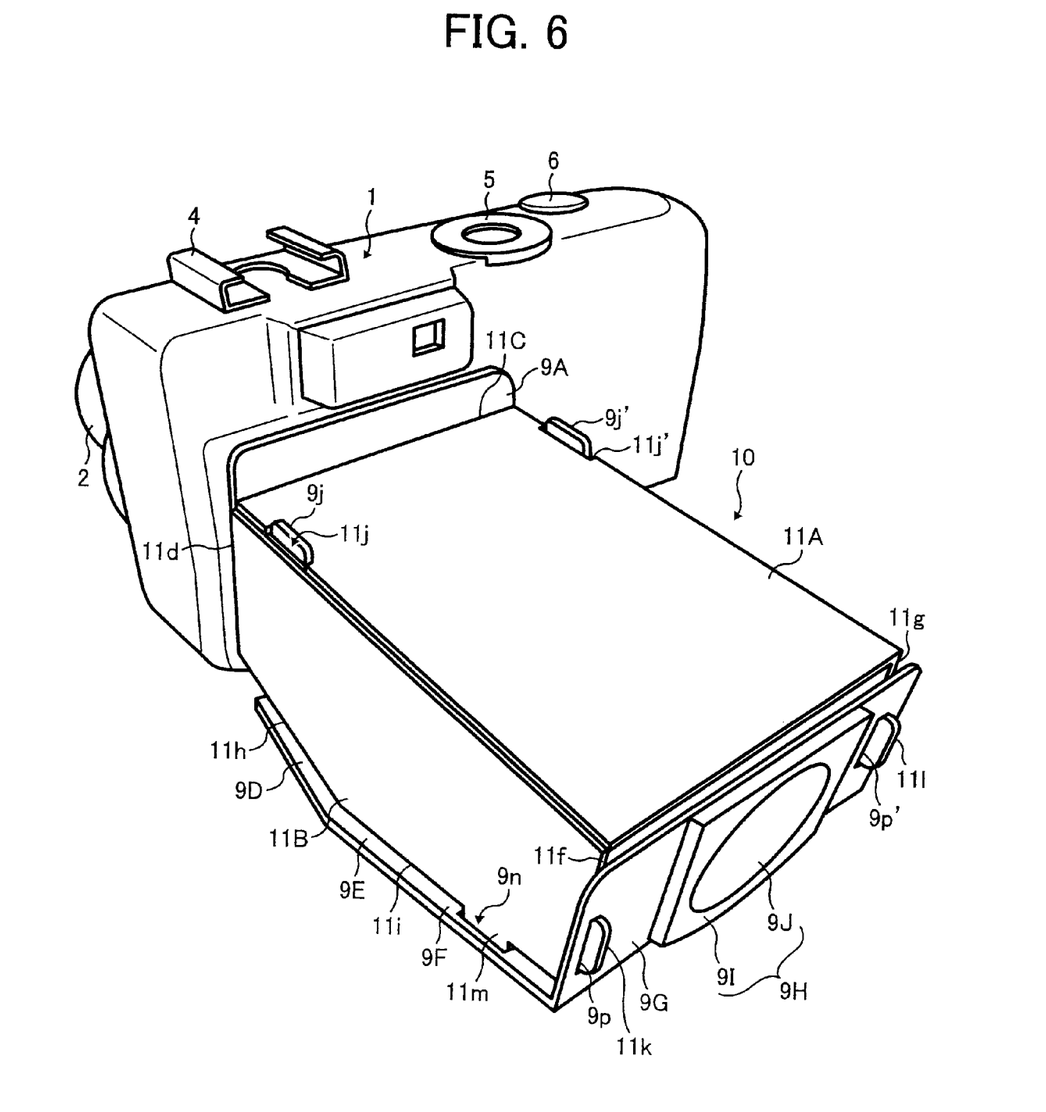
FIG. 6 is an external view of the camera viewer device according to the present invention attached to the digital camera in the form of a second configuration.

As shown in FIG. 6, the camera viewer device 10 is detachably fixed at the back face portion of the camera body 1, while being opposed to the display panel 3.

Figure 10:
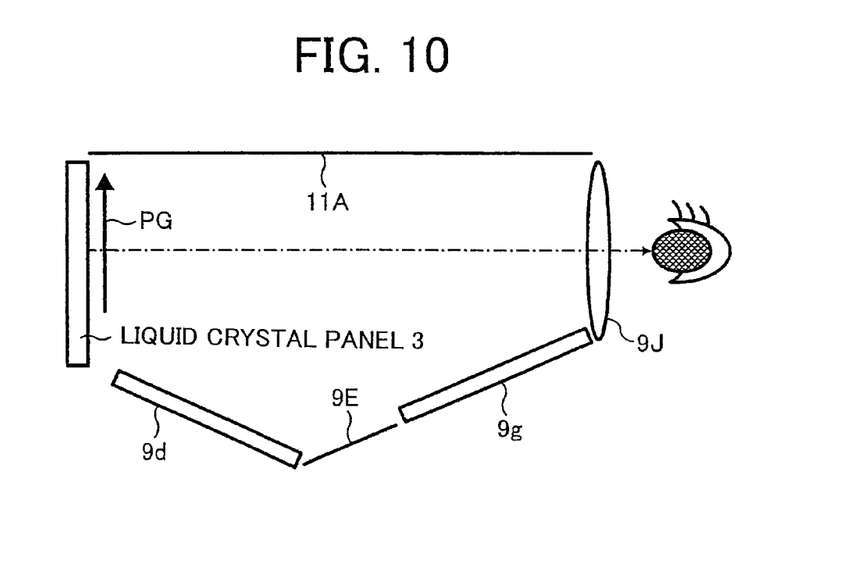
FIG. 10 is a schematic view illustrating the function of the camera viewer device according to the present invention as assembled in the form of the second configuration.

According to the camera viewer device 10 and as shown schematically therein, the upper wall portion 9G, which is located at the upper side when the camera viewer device 10 is used in the form of the first configuration, is fixed at the position opposed to the display panel 3 when used in the form of the second configuration. Therefore, the image PG of the subject displayed in the display panel 3 can be directly observed through the magnifying lens 9J as it is.

Therefore, according to the camera viewer device 10 of this embodiment of the present invention, it can be used as either one of the low angle finder or the direct viewing type finder. Further, the camera viewer device can prevent the external light from entering the finder, and enables the subject image PG to be visually recognized in the magnified scale. In addition, the camera viewer device can be assembled without increasing the number of the parts.

Figure 11:
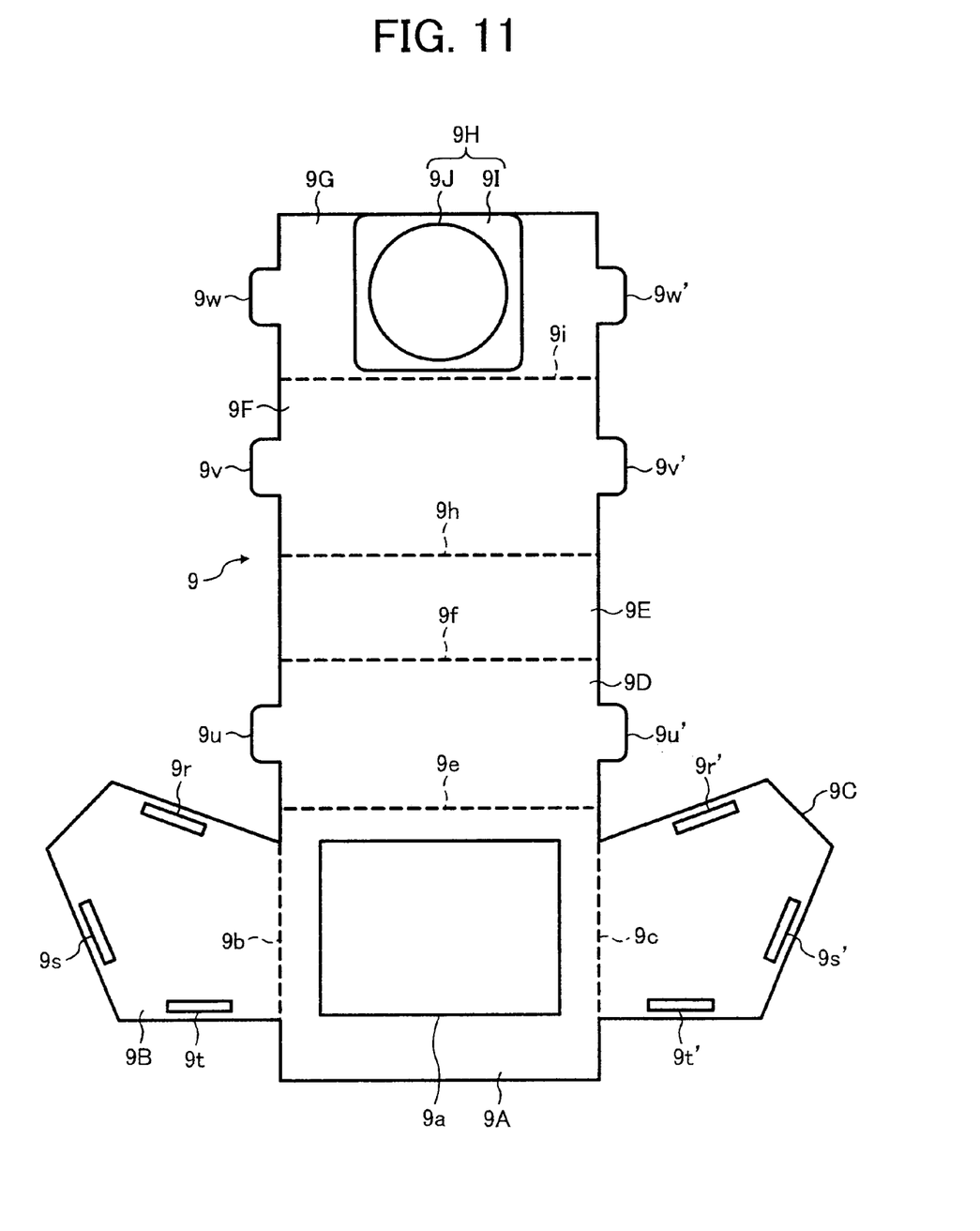
FIG. 11 shows a sheet member according to another embodiment of the camera viewer device of the present invention similar to that shown in FIGS. 2 and 3.

FIG. 11 shows a sheet member according to another embodiment of the camera viewer device of the present invention identical with that shown in FIGS. 2 and 3 except that insertion holes 9r, 9s, 9t, 9r', 9s', 9t' are formed at a pair of the external light-shielding wall portion of the sheet member, and the second mirror wall portion, the first mirror wall portion and the upper wall portion are formed with inserting pieces 9u, 9u', 9v, 9v', 9w, 9w' which are inserted into the insert holes 9r, 9r', 9s, 9s', 9t, 9t', respectively.

What is claimed is:

1. A camera viewer device, comprising
an assembling sheet member configured to develop and change in shape between a first configuration to be detachably attachable to a side of a back face of a camera body and used as a box-shaped angle finders, and a second configuration to be detachably attachable to the side of the back face of the camera body and used as a direct viewing finder, said sheet member comprising
a first mirror wall portion attached with a first mirror at an inner side thereof,
a second mirror wall portion attached with a second mirror at an inner side thereof,
an attachment wall portion configured to attach to the back face side of the camera body and having a window portion configured to oppose the back face side of the camera body, and
an upper wall portion,
wherein when the sheet member is assembled in the form of the first configuration, the first mirror is configured to reflect an image of a subject displayed in a display panel disposed on the back face side of the camera body and to downwardly project the image of the subject, the second mirror is configured to upwardly project the projected image projected from the first mirror, the window portion of the attachment wall portion is opposed to the display panel, and a window portion of the upper wall portion is opposed to the second mirror wall portion so that the interior of the assembled sheet member is looked into through the window portion of the upper wall portion.

2. The camera viewer device set forth in claim 1, which further comprises:
an attachment member and wherein when the sheet member is assembled in the form of the second configuration, the attachment member is configured to fix the first mirror wall portion at a position which is retracted in a direction of the bottom from the position opposed to the display panel, and the attachment member is configured to specify the positional relationship among the second mirror wall portion, the first mirror wall portion and the upper wall portion so that the attachment member fixes the upper wall portion at the position opposed to the display panel.

3. The camera viewer device set forth in claim 2, which further comprises:
a pair of external light-shielding wall portions integrally and bendably formed with said attachment wall portion and wherein each of the external light-shielding wall portions is connected to the second mirror wall portion, the first mirror wall portion and the upper wall portion and the external light-shielding wall portions are configured to shield external light that would enter a space defined by the upper wall portion and the second mirror wall portion opposed to each other, from sides of the assembled sheet member.

4. The camera viewer device set forth in claim 3, wherein the attachment member comprises:
a pair of light-shielding wall portions, a light-shielding upper wall portion, and a pair of light-shielding side wall portions and wherein when the sheet member is assembled in the form of the second configuration, the light-shielding upper wall portion is configured to cover the second mirror portion and the first mirror portion from an upper side, and the pair of light-shielding wall portions are configured to shield external light that would enter a space defined between the light-shielding upper wall portion and the pair of light-shielding side wall portions opposed to each other.

5. The camera viewer device set forth in claim 3, wherein inserting pieces are formed at each of the pair of external light-shielding wall portions of the sheet member, and each of the first mirror wall portion, the upper wall portion and the second mirror wall portion is formed with insertion holes into which the inserting pieces are to be inserted, respectively.

6. The camera viewer device set forth in claim 3, wherein insertion holes are formed at the pair of external light-shielding wall portions of the sheet member, and the first mirror wall portion, the upper wall portion and the second mirror wall portion are formed with inserting pieces which are inserted into the inserting holes of the pair of external light-shielding wall portions portion, respectively.

7. The camera viewer device set forth in claim 5 or 6, wherein the attachment member is formed with inserting pieces to be inserted into insertion holes formed in the sheet member as well as the insertion holes into which the inserting pieces formed at the sheet member are inserted.

8. The camera viewer device set forth in claim 1, wherein a transparent member is provided in the window portion of the upper wall portion.

9. The camera viewer device set forth in claim 2, wherein a transparent member is provided in the window portion of the upper wall portion.

10. The camera viewer device set forth in claim 3, wherein a transparent member is provided in the window portion of the upper wall portion.

11. The camera viewer device set forth in claim 4, wherein a transparent member is provided in the window portion of the upper wall portion.

12. The camera viewer device set forth in claim 5, wherein a transparent member is provided in the window portion of the upper wall portion.

13. The camera viewer device set forth in claim 6, wherein a transparent member is provided in the window portion of the upper wall portion.

14. The camera viewer device set forth in claim 7, wherein a transparent member is provided in the window portion of the upper wall portion.

15. The camera viewer device set forth in claim 8, wherein the transparent member is an ocular lens.

16. The camera viewer device set forth in claim 9, wherein the transparent member is an ocular lens.

17. The camera viewer device set forth in claim 10, wherein the transparent member is an ocular lens.

18. The camera viewer device set forth in claim 11, wherein the transparent member is an ocular lens.

19. A camera viewer device, comprising
an assembling sheet member configured to develop and change in shape between a first configuration to be detachably attachable to a side of a back face of a camera body and used as a box-shaped angle finders, and a second configuration to be detachably attachable to the side of the back face of the camera body and used as a direct viewing finder, said sheet member comprising
a first mirror wall portion attached with a first mirror at an inner side thereof,
a second mirror wall portion attached with a second mirror at an inner side thereof,
an attachment wall portion configured to attach to the back face side of the camera body and having a window portion configured to oppose the back face side of the camera body, and
an upper wall portion having a window portion and a pair of external light-shielding wall portions integrally and bendably formed at the attachment wall portion,
wherein when the sheet member is assembled in the form of the first configuration, the first mirror is configured to reflect an image of a subject displayed in a liquid crystal display panel disposed on the back face side of the camera body and to downwardly project the image of the subject, the second mirror is configured to upwardly project the projected image projected from the first mirror, the window portion of the attachment wall portion is opposed to the display panel, the window portion of the upper wall portion is opposed to the second mirror wall portion so that the interior of the assembled sheet member is looked into through the window portion of the upper wall portion, each of the external light-shielding wall portions is connected to the second mirror wall portion, the first mirror wall portion and the upper wall portion and the external light-shielding wall portions are configured to shield external light that would enter a space defined by the upper wall portion and the second mirror wall portion opposed to each other, from sides of the assembled sheet member, when the sheet member is assembled in the form of the second configuration, the attachment member is configured to fix the first mirror wall portion at a position which is retracted in a direction of the bottom from the position opposed to the display panel, and the attachment member is configured to specify the positional relationship among the second mirror wall portion, the first mirror wall portion and the upper wall portion so that the attachment member fixes the upper wall portion at the position opposed to the display panel, the pair of external light-shielding wall members are formed with inserting pieces, and the attachment member is formed with inserting pieces, the attachment wall portion, the upper wall portion, the first mirror wall portion, the second mirror wall portion and the attachment member are formed with insertion holes, respectively, the corresponding inserting pieces of the pair of external light-shielding wall portions are inserted into the insertion holes formed in the upper wall portion, the first mirror wall portion and the second mirror wall portion, respectively, and the inserting pieces of the attachment member are inserted into the insertion holes formed in the upper wall portion and the insertion hole formed in the first mirror wall portion, and the corresponding inserting pieces formed in the pair of external light-shielding wall members are inserted into the insertion holes of the attachment member, respectively.

20. The camera viewer device set forth in claim 19, wherein the attachment wall portion or the camera body is provided with a hook and loop fastener or an adhesive tape for attaching the sheet member to the camera body.

* * * * *